S. H. GILLESPIE.
CENTRIFUGAL DECORTICATOR.
APPLICATION FILED JUNE 17, 1921.

1,427,457.

Patented Aug. 29, 1922.

Inventor
SAMUEL H. GILLESPIE
By his Attorney
O. Ellery Edwards

UNITED STATES PATENT OFFICE.

SAMUEL H. GILLESPIE, OF MORRISTOWN, NEW JERSEY.

CENTRIFUGAL DECORTICATOR.

1,427,457. Specification of Letters Patent. Patented Aug. 29, 1922.

Application filed June 17, 1921. Serial No. 478,262.

*To all whom it may concern:*

Be it known that I, SAMUEL H. GILLESPIE, a citizen of the United States, and a resident of Morristown, Morris County, State of New Jersey, have invented a new and useful Improvement in Centrifugal Decorticators, of which the following is a specification.

The object of my invention is to provide a decorticator which will remove the shells of nuts and other objects with great speed and facility and without injury to the meat, kernel or contents of the shell. This and other objects are accomplished by my invention, one embodiment of which is hereafter more particularly set forth.

Figure 1:
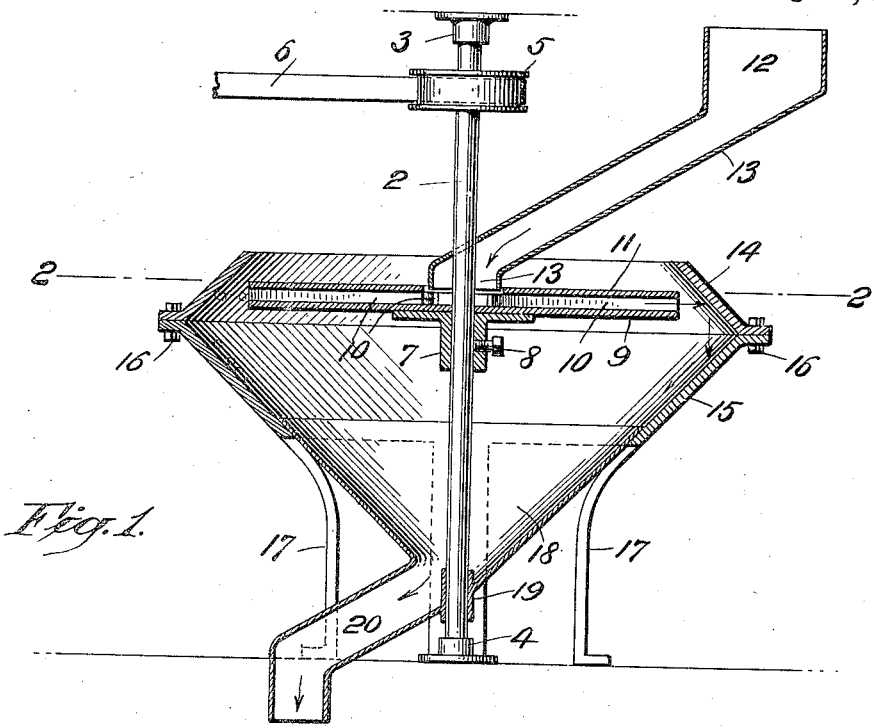
Figure 2:
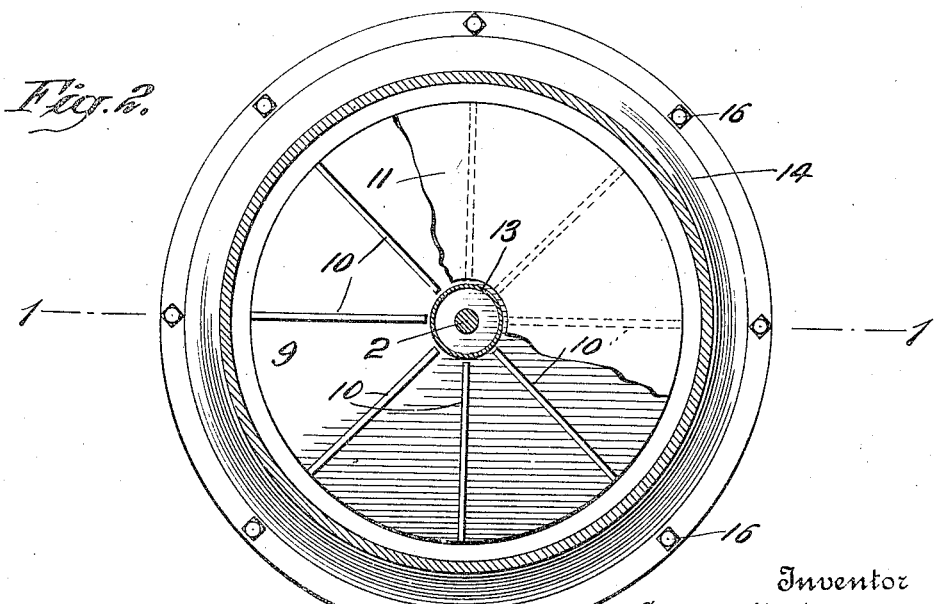

For a more detailed description of my invention, reference is to be had to the accompanying drawings, forming a part hereof, in which Figure 1 is a longitudinal section of my improved decorticator, the section being taken on the line 1—1 of Figure 2.

Figure 2 is a sectional view taken on the line 2—2 of Figure 1.

Throughout the various views of the drawings, similar reference characters designate similar parts.

My improved decorticator 1, in the preferred embodiment, is a centrifugal decorticator which is provided with a vertical shaft 2 mounted in suitable bearings, top and bottom, 3 and 4 respectively, and it is provided with a pulley 5 which receives power from a belt 6, or in any other suitable way. At any desired location, although preferably about as shown, this shaft 2 carries an adjustably mounted boss 7 which is fixed thereon by a set screw 8, or any other suitable means, and this boss carries a disc 9 with radially disposed ribs 10 fixed thereon which terminate short of the shaft 2 and these ribs are surmounted by a disc 11 which is fixed thereon and open at its center so that spaces are preserved large enough for the nuts to pass through between the disc 11 and disc 9 and ribs 10 immediately before they are decorticated by a means which will be described below.

A hopper 12 is provided with a chute 13 through the lower end of which the shaft 2 passes, and the lower end of this chute 13 surrounds this shaft and the chute projects into the opening at the center of the disc 11. Nuts or other objects to be decorticated are put into the hopper 12 and pass from thence down the chute 13 to the center of the disc 9 which is rotated at a high speed and from there these nuts are thrust by centrifugal force radially from the spaces between the ribs 10 and discs 11 and 9.

The disc 9 and its connected parts are surrounded by the frusta of two cones 14 and 15 which have their bases flanged and connected by bolts 16 and their top and bottom are open. They are preferably placed as shown and are made in any suitable way. If desired, they may be made in sections and they should be made of a rigid and strong material, such as cast iron. In the preferred embodiment of my invention, the part 14 is supported by the frustum 15 which in turn is supported by suitable legs 17, or in any other desired way. The lower end of the frustum 15 is closed by a suitable conical hopper 18 which has a boss 19 mounted therein to receive the shaft 2 and the lower end of this hopper is connected to a chute 20 through which the shells and meat of the decorticated nuts can pass to any suitable receptacle.

In view of the foregoing, the operation of my improved decorticator will be readily understood. Nuts or other objects to be decorticated are placed in the hopper 12 after the disc 9 and its connected parts are brought up to a proper speed by means of power derived through the belt 6. As soon as this speed has been obtained and nuts flow down the chute 13, they fall on the disc 9 and then are projected, as above described, until they strike the frustum 14 where they are cracked and their velocity is somewhat reduced and then the cracked nuts are projected on the frustum 15 with sufficient force to separate the shells and meat and when this occurs the two fall together by gravity and what remains of the centrifugal force which originally projected them from the disc 9, into the hopper 18 and from thence through the chute 20 and away from the apparatus and in a suitable receptacle from which they may be taken for separation or other treatment. It is obvious that the force with which these nuts are projected from the disc 9 will depend upon the speed of rotation of this disc, and this speed may be determined by regulating the angular velocity, according to the nature and characteristics of the nuts or other objects which are to be decorticated. The nuts which are decorticated are forcibly driven successively against two surfaces, the first causing a cracking and the second a separation between the shell and contents.

While I have shown and described one embodiment of my invention, it is obvious that it is not restricted thereto, but that it is broad enough to cover all structures that come within the scope of the annexed claims.

Having thus described my invention, what I claim is:

1. In a device of the class described, means for projecting a nut, an inclined surface at an angle to the direction of movement of the nut which is adapted to receive the impact of the nut and crack the same and a second inclined surface intersecting the path of rebound from the first surface and adapted to receive the nut with a glancing blow from the first inclined surface and separate the meat from the shell.

2. In a device of the class described, a centrifugal means for projecting a nut, a frustum of a cone at an angle to the direction of movement of the nut which is adapted to receive the nut from the centrifugal means so that the nut will be cracked by the force of impact and a second inclined frustum of a cone intersecting the rebound from the first surface and adapted to receive the nut with a glancing blow from the first frustum of the cone and separate the meat from the shell.

In testimony whereof, I have hereunto set my hand this 13th day of June, 1921.

SAMUEL H. GILLESPIE.

Witness:
GEORGE W. MELVEN.